Apr. 10, 1923.
G. F. CRYSDALE
1,451,651
BICYCLE STAND AND CARRIER
Filed Aug. 1, 1921
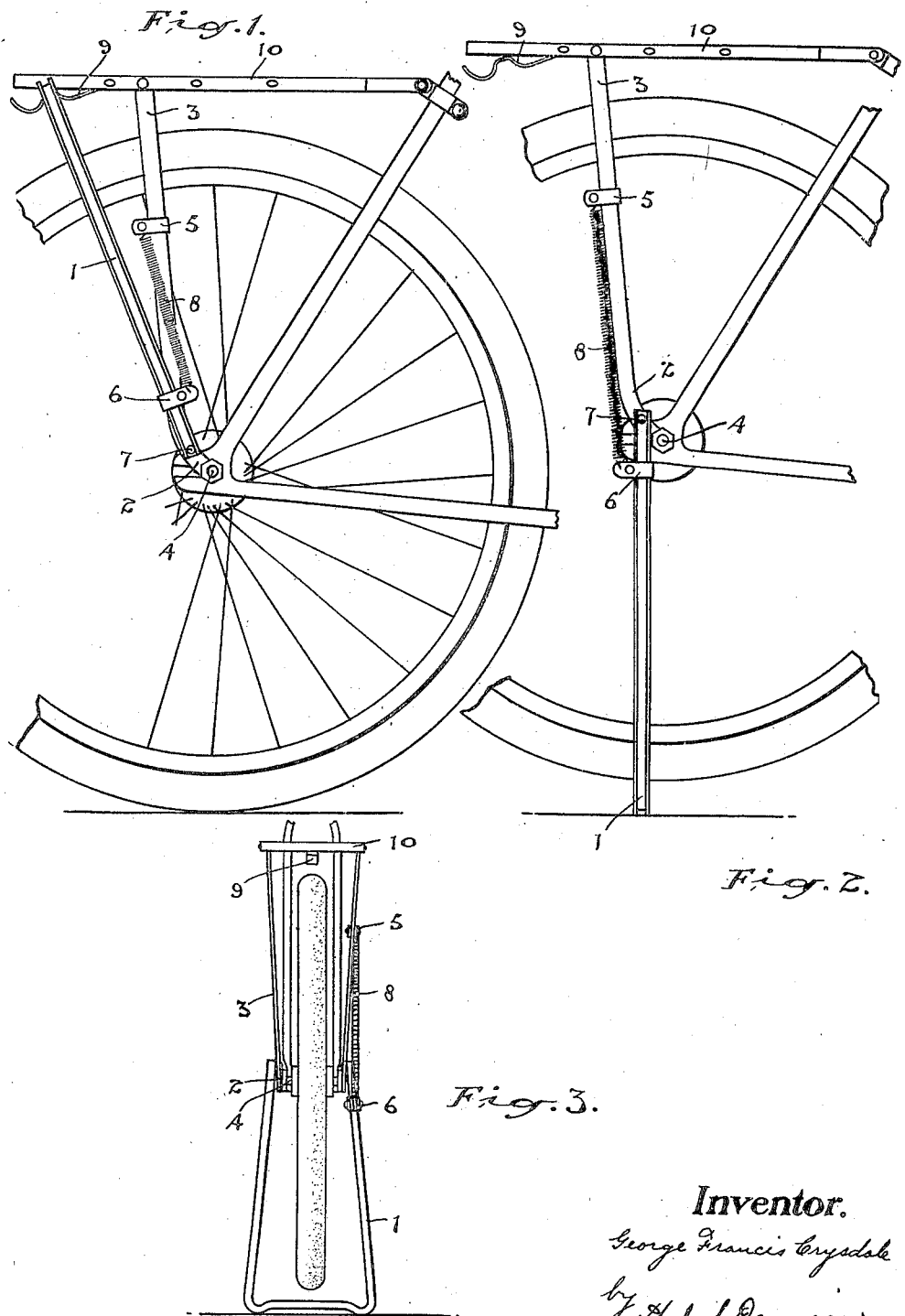
Inventor.
George Francis Crysdale
by H. J. S. Dennison
atty.

Patented Apr. 10, 1923.

1,451,651

UNITED STATES PATENT OFFICE.

GEORGE FRANCIS CRYSDALE, OF TORONTO, ONTARIO, CANADA.

BICYCLE STAND AND CARRIER.

Application filed August 1, 1921. Serial No. 488,827.

*To all whom it may concern:*

Be it known that I, GEORGE FRANCIS CRYSDALE, a subject of the King of Great Britain, and resident of the city of Toronto, county of York, Province of Ontario, in the Dominion of Canada, have invented certain new and useful Improvements in a Bicycle Stand and Carrier, described in the following specification and illustrated in the accompanying drawings, that form part of the same.

The principal object of this invention is to provide a simple and reliable means for lifting the stand to its raised position which will prevent it from falling while the bicycle is in use.

The principal feature of the invention consists in the novel arrangement of a coil spring having one end connected to the rigid carrier support and the other end connected to the pivotal stand so that it will swing the stand on its pivot when released from the weight of the bicycle.

In the drawings Figure 1 is a side elevational view showing the stand and carrier attached to the rear end of a bicycle frame, the stand being in the raised position.

Figure 2 is an elevational view showing the stand lowered and supporting the bicycle.

Figure 3 is a back view of the stand and carrier with the stand lowered.

Parcel carriers have been used on bicycles connected to the rear stays above the wheel and supported by strut bars from the axle and pivotal stands have also been used to support the bicycle in a standing position, the latter being pivoted and held in a raised position by a spring clip on the carrier, but hitherto no effective means has been provided for raising the stand upon the release of the stand from the weight of the bicycle.

In order to accomplish this I pivot the stand 1 which is formed of a looped length of channel steel to the curved lower ends 2 of the carrier support bars 3, the pivot being arranged a short distance back of the wheel axle 4.

A clip collar 5 is adjustably secured to the carrier support mid-way of its length and a similar clip collar 6 is adjustably secured to the stand 1 at a point a short distance from the pivot 7. Each of the clip collars is provided with a lug and a coil tension spring 8 is arranged between the said lugs. The spring is of a close coil form and the collars are adjusted so that the coils are slightly separated when the stand is in the raised position and held in the spring clip 9 secured to the carrier 10.

When the stand is released from the clip 9 and swung downwardly, it stretches the spring 8 and by reason of the lug of the clip collar 6 projecting to the rear side of the pivot of the stand when the bicycle is raised to relieve the weight from the stand, the spring pulls upwardly with sufficient strength to swing the stand on its pivot until it snaps into engagement with the clip 9 where it is then held.

The slight tension retained upon the spring when the stand is in its uppermost position assists in supporting the weight of the stand and prevents its accidental release from the clip 9 but even if the stand should become freed the tension of the spring will not allow the stand to swing down below the horizontal or far enough to interfere with the proper operation of the bicycle and the stand will therefore not be liable to cause an accident through dragging on the ground.

The structure is extremely simple and very effective and costs very little to manufacture and as will be noted any desired adjustment may be given to the spring by shifting the collars 5 and 6.

What I claim as my invention is:—

In a bicycle stand and carrier, the combination with the bicycle frame, of a carrier rigidly connected to the frame, a pair of uprights rigidly secured to the carrier and connected to the axle of the bicycle, a U-shaped stand pivoted to said uprights above and to the rear of the axle, and a coil spring having one end connected to said uprights and its other end connected to the stand.

GEORGE FRANCIS CRYSDALE.